US008202402B2

(12) United States Patent
Capan

(10) Patent No.: US 8,202,402 B2
(45) Date of Patent: Jun. 19, 2012

(54) SYSTEM AND METHOD OF PASSIVE LIQUID PURIFICATION

(75) Inventor: Rahmi Oguz Capan, Marmaris (TR)

(73) Assignee: Hse Hittt Solar Enerji Anonim Sirkerti, Istanbul (TR)

( * ) Notice: Subject to any disclaimer, the term of this patent is extended or adjusted under 35 U.S.C. 154(b) by 779 days.

(21) Appl. No.: 11/605,340

(22) Filed: Nov. 29, 2006

(65) Prior Publication Data
US 2007/0131534 A1 Jun. 14, 2007

Related U.S. Application Data

(60) Provisional application No. 60/740,278, filed on Nov. 29, 2005, provisional application No. 60/833,260, filed on Jul. 26, 2006.

(51) Int. Cl.
B01D 3/10 (2006.01)
C02F 1/04 (2006.01)

(52) U.S. Cl. .............. 203/11; 159/47.1; 159/DIG. 16; 202/205; 202/266; 203/1; 203/2; 203/4; 203/10; 203/25; 203/39; 203/91; 203/DIG. 8; 210/774

(58) Field of Classification Search ............ 159/44, 159/47.1, 903, DIG. 16; 202/181, 205, 206, 202/234, 266; 203/1, 2, 4, 10, 11, 25, 39, 203/91, DIG. 1, DIG. 4, DIG. 8; 210/774
See application file for complete search history.

(56) References Cited

U.S. PATENT DOCUMENTS

| 3,935,077 | A | * | 1/1976 | Dennison | 202/83 |
|---|---|---|---|---|---|
| 4,261,796 | A | * | 4/1981 | Lemoine | 202/176 |
| 4,306,940 | A | * | 12/1981 | Zenty | 202/83 |
| 4,536,257 | A | * | 8/1985 | Atwell | 202/177 |
| 4,545,862 | A | * | 10/1985 | Gore et al. | 203/10 |
| 4,680,090 | A | * | 7/1987 | Lew | 202/187 |
| 4,698,136 | A | * | 10/1987 | El-Allawy | 203/11 |
| 4,929,312 | A | * | 5/1990 | Westcott | 203/2 |
| 4,954,223 | A | * | 9/1990 | Leary et al. | 203/1 |
| 5,060,487 | A | * | 10/1991 | Murray | 62/475 |
| 5,282,979 | A | * | 2/1994 | Wilson | 210/774 |
| 5,368,698 | A | * | 11/1994 | Field et al. | 202/180 |
| 5,552,022 | A | * | 9/1996 | Wilson | 202/176 |
| 6,010,599 | A | * | 1/2000 | Wang et al. | 202/205 |
| 6,663,770 | B2 | * | 12/2003 | Sears | 210/175 |
| 6,766,817 | B2 | | 7/2004 | da Silva | |
| 6,918,404 | B2 | | 7/2005 | Dias da Silva | |
| 7,041,198 | B2 | * | 5/2006 | Atwell | 203/2 |
| 7,066,586 | B2 | | 6/2006 | da Silva | |
| 7,244,398 | B2 | | 7/2007 | Kotary et al. | |

(Continued)

FOREIGN PATENT DOCUMENTS

DE 10 2005 017 007 A1 10/2005

(Continued)

Primary Examiner — Virginia Manoharan
(74) Attorney, Agent, or Firm — Gokalp Bayramoglu

(57) ABSTRACT

The present invention relates to systems and related methods of water purification by distillation that will operate in a self-contained mode using a passive heat source, such as, without limitation, solar heat, air conditioning waste heat, or waste heat from the exhaust or cooling systems of an internal combustion engine, which may be used to desalinate sea water, saline water, or saline water containing contaminants. The present invention may also be used to distil sewage water, creek water, swamp water or water containing contaminants or used to cleanse or purify water contaminated with mud, chemicals, minerals, or bacteria in a local environment.

8 Claims, 18 Drawing Sheets

U.S. PATENT DOCUMENTS

| | | |
|---|---|---|
| 7,285,255 B2 | 10/2007 | Kadlec et al. |
| 7,347,918 B2 * | 3/2008 | Northrup, Jr. .................. 203/1 |
| 7,431,806 B2 * | 10/2008 | Levine ........................... 203/10 |
| 7,507,316 B2 * | 3/2009 | Ward ............................. 202/234 |
| 2004/0104154 A1 * | 6/2004 | Sears ............................. 210/175 |
| 2007/0012556 A1 * | 1/2007 | Lum et al. ..................... 203/10 |
| 2007/0068791 A1 * | 3/2007 | Thom et al. ................... 203/2 |
| 2007/0084713 A1 * | 4/2007 | Deep et al. .................... 202/160 |
| 2008/0015531 A1 | 1/2008 | Hird et al. |
| 2008/0173260 A1 * | 7/2008 | Lange ............................ 122/31.1 |

FOREIGN PATENT DOCUMENTS

| | | |
|---|---|---|
| FR | 2 265 430 A1 | 10/1975 |
| FR | 2 471 799 A1 | 6/1981 |
| GB | 1 212 632 A | 11/1970 |
| WO | WO 97/49473 | 12/1997 |

* cited by examiner

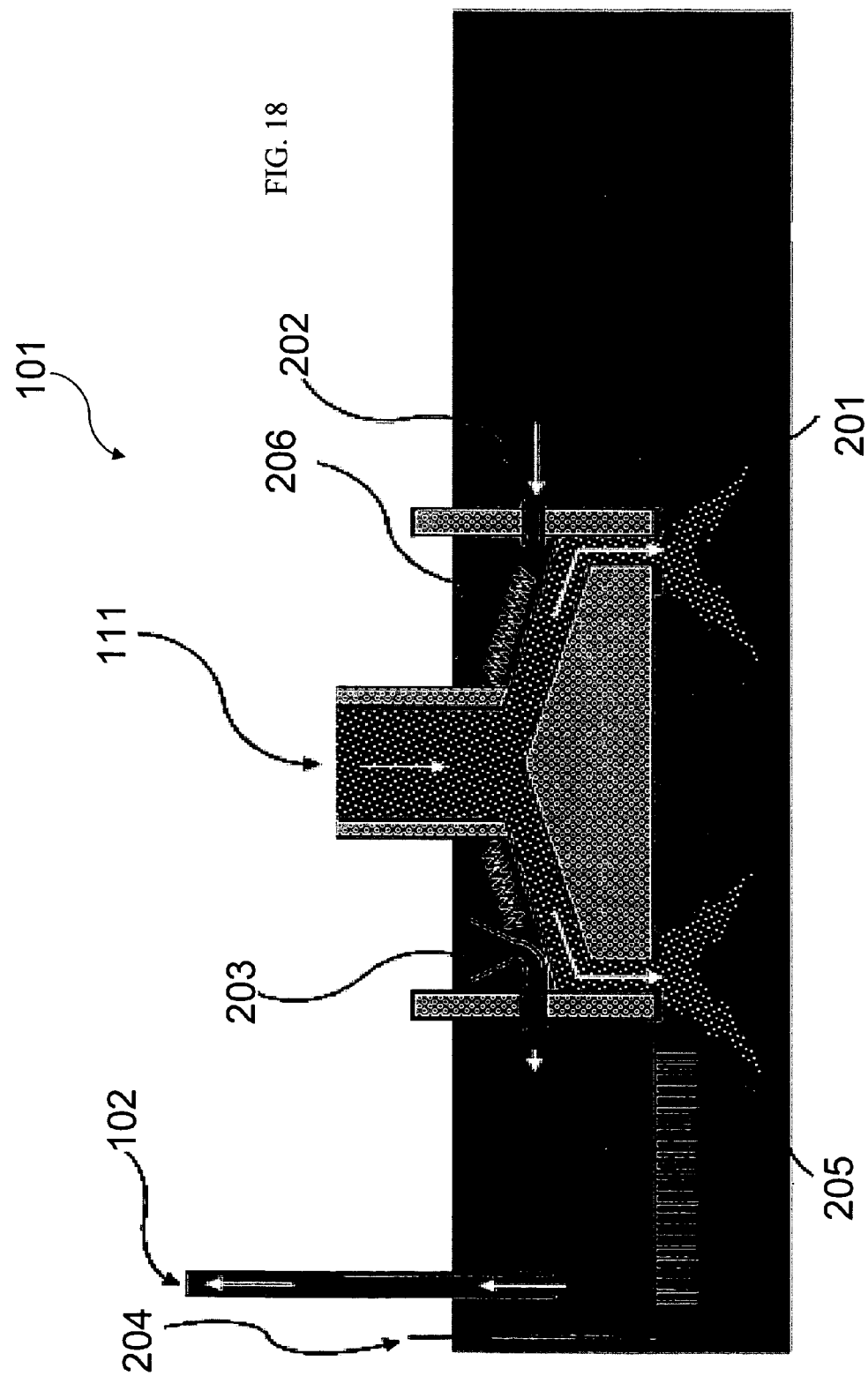

SYSTEM AND METHOD OF PASSIVE LIQUID PURIFICATION

CROSS REFERENCE TO RELATED APPLICATIONS

The present application is related to and claims the benefit under 35 U.S.C. §119(e) of U.S. Provisional Patent Application Ser. No. 60/740,278 filed Nov. 29, 2005 and U.S. Provisional Patent Application Ser. No. 60/833,260 filed Jul. 26, 2006.

FIELD OF THE INVENTION

The present invention relates to methods and systems for liquid purification. More specifically, the present invention relates to the removing of impurities from water using localized heating and cooling sources.

BACKGROUND OF THE INVENTION

There is a need for pure drinking water across the globe. This need is greater in certain parts of the world because they are devoid of natural water resources or lack abundant water resources to meet the needs of their populace. Further, these areas of the world are often quite impoverished, with few funds available to use towards procuring clean water.

Currently, there are several known methods for removing impurities from water, including, without limitation, multi-stage flash distillation, multi-effect distillation, vapor compression, electro dialysis, reverse osmosis, and freezing. Each of the methods mentioned above has one or more disadvantages. First, they each have high operating costs due to the high levels of energy and maintenance required. Second, the capital investment and installation costs for each are very high. Third, the existing processes have little or no effect on chemical and oil contaminants in the water.

There is a need for a system that eliminates the above shortcomings—a low cost system capable of removing impurities from water.

SUMMARY OF THE INVENTION

The present invention eliminates the above-described disadvantages and provides for the above-described need by teaching, for example, a system and method for removing impurities from source water by utilizing localized heating and cooling to produce fresh water. By "source water" it is meant any water that is to be purified by the present invention. For illustrative purposes only, and not to limit the invention, such source water may be seawater, saline water, brackish water, brine, sewage water, creek water, swamp water, or water containing contaminants.

The present invention may also provide low cost, low maintenance water purification, by, in specific embodiments, utilizing sunlight to provide the heat needed to purify the source water. In other specific embodiments, the present invention may utilize waste heat from some other apparatus, such as, without limitation, an air conditioner or an internal combustion engine.

In one specific embodiment, the water purification system of the present invention comprises a degasification unit; a source water inlet line; a heating unit; an evaporation chamber; a condensing chamber; a cooling unit; a water discharge line; and a wastewater discharge line; wherein the source water inlet line is connected to the evaporation chamber; wherein the heating unit is connected to the evaporation chamber; wherein the evaporation chamber is connected to the wastewater discharge line; wherein the evaporation chamber is connected to the condensing chamber; wherein the cooling unit is connected to the condensing chamber; wherein the water discharge line is connected to the condensing chamber; wherein the degasification unit acts to remove dissolved gases from source water before it enters the source water inlet line; wherein the source water is deposited into the evaporation chamber via the source water inlet line; wherein the water in the evaporation chamber is heated by the heating unit and converts into water vapor and wastewater; and wherein the water vapor then passes into the condensing chamber, where it is cooled by the cooling element and condenses.

In another specific embodiment, the degasification unit in the water purification system of the present invention comprises a degasification tank, a degasification inlet line, a discharge funnel, and a source water storage tank. In another specific embodiment of the water purification system of the present invention, the degasification tank is mounted such that it surrounds the wastewater discharge line; wherein the degasification inlet line is connected to the degasification chamber; wherein the discharge funnel is attached to the source water storage tank; wherein the degasification inlet line allows source water to enter the degasification tank; wherein heat from the wastewater discharge line heats the source water in the degasification tank causing gases dissolved in the source water to escape into the atmosphere; wherein the discharge funnel allows degasified source water to enter the source water storage tank.

In one specific embodiment, the heating unit in the water purification system of the present invention comprises a heat source selected from the group consisting of: a heat pipe, a heat sheet, waste heat from an air conditioner, and waste heat from a combustion engine. In one specific embodiment, the cooling unit in the water purification system of the present invention comprises a heat sheet.

In one specific embodiment of the water purification system of the present invention, the evaporation chamber operates under partial vacuum conditions. In one specific embodiment, the evaporation chamber in the water purification system of the present invention, is insulated. In one specific embodiment, the cooling unit in the water purification system of the present invention is configured to remove twice as much heat from the system as the heating unit is configured to put into the system.

In one specific embodiment of the water purification system of the present invention, each of the source water inlet line, the evaporation chamber, the condensing chamber, the water discharge line, and the wastewater discharge line comprise pipe constructed of polyvinyl chloride.

In one specific embodiment, the present invention provides a method comprising using the water purification system of claim 1.

In one specific embodiment, the present invention provides a method comprising a method of water purification comprising degasifying source water; transferring the source water into an evaporation chamber; evaporating the source water into water vapor; transferring the water vapor to a condensing chamber; and condensing the water vapor.

In another specific embodiment, the evaporating in the method of water purification of the present invention is facilitated by a heating unit attached to the evaporation chamber. In one specific embodiment, the heating unit used in the method of water purification of the present invention comprises a heat source selected from the group consisting of: a heat pipe, a heat sheet, waste heat from an air conditioner, and waste heat from a combustion engine.

In another specific embodiment, the condensing in the method of water purification of the present invention is facilitated by a cooling unit attached to the condensing chamber. In one specific embodiment, the cooling unit used in the method of water purification of the present invention comprises a heat sheet.

In another specific embodiment, the evaporating in the method of water purification of the present invention occurs under partial vacuum conditions. In one specific embodiment, the evaporation chamber used in the method of water purification of the present invention is insulated.

In another specific embodiment, the degasifying in the method of water purification of the present invention is accomplished by a degasification unit which comprises a degasification tank, a degasification inlet line, a discharge funnel, and a source water storage tank. In one such specific embodiment of the method of water purification of the present invention, the degasification inlet line is connected to the degasification chamber; wherein the discharge funnel is attached to the source water storage tank; wherein the degasification inlet line allows source water to enter the degasification tank; wherein the source water in the degasification tank is heated causing gases dissolved in the source water to escape into the atmosphere; and wherein the discharge funnel allows degasified source water to enter the source water storage tank In one specific embodiment of the method of water purification of the present invention, each of the evaporation chamber and the condensing chamber comprise pipe constructed of polyvinyl chloride.

BRIEF DESCRIPTION OF THE DRAWINGS

FIG. 18 is a cross-sectional diagram of the degasification unit of one specific embodiment of a water purification system of the present invention.

DETAILED DESCRIPTION OF THE PREFERRED EMBODIMENT

A goal of the present invention is to provide for a system of water purification that will operate in a self-contained mode using a passive heat source, such as, without limitation, solar heat, air conditioning waste heat, or waste heat from the exhaust or cooling systems of an internal combustion engine. Another goal of the present invention is to provide for a system of water purification that will be simple enough to be manufactured in local fabrication shops and be suitable for installation, operation and/or maintenance by local contractors.

As such, the present invention may be used to desalinate sea water, saline water, or saline water containing contaminants. The present invention may also be used to distil sewage water, creek water, swamp water or water containing contaminants. The present invention may further be used to cleanse or purify water contaminated with mud, chemicals, minerals, or bacteria.

The purification concept of the invention is based on the method of purification by distillation. The aim is to substantially improve the efficiency of both the vaporization and condensation processes of this method by creating a partial vacuum during the initial commissioning of the vessel and maintaining it naturally, in a non-energy consuming manner, throughout the operation. This partial vacuum allows a low temperature operation as well as the natural and continuous draining of the wastewater. This in turn eliminates the formation of scale within the vessel. Low temperature also helps prevent most chemical contaminants from vaporizing and contaminating the water vapor. Some existing technologies also utilize this partial vacuum condition to lower the boiling point, however, unlike the present invention, which utilizes natural atmospheric pressure and fluid statics, they consume high levels of energy to create and maintain even small levels of vacuum conditions. In addition, the present invention may use solar heat, air conditioning waste heat, or internal combustion engine waste heat to eliminate fuel and electricity costs. The factors of no fuel consumption, low maintenance, and a simple design that is suitable for local manufacturing makes this a convenient system to provide fresh and safe water at low costs, for example, in isolated locations and rural areas as well as in large-scale industrial applications.

Figure 1:
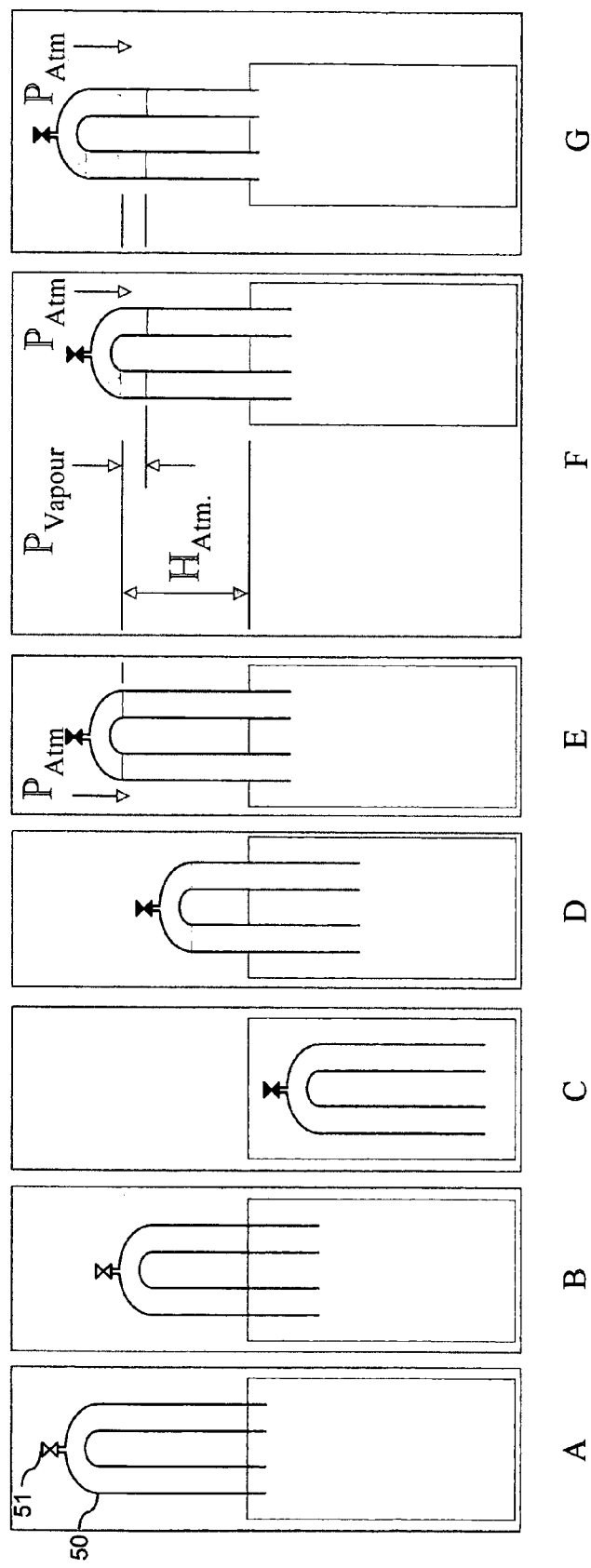
FIG. 1 is a series of cross-sectional diagrams that demonstrate one method for establishing the partial vacuum necessary for the operation of a specific embodiment of the water purification system of the present invention.

Referring to FIG. 1, an upside down U-tube vessel 50 with an open vent valve 51 on its top is sunk it into the sea or other source water source. FIG. 1A. It is important to note that these Figures may not be drawn to scale, they are instead drawn to show details of the present invention as much as possible. As U-tube 50 sinks, the water level inside and outside it remains the same while the air in U-tube 50 is pushed out through open vent valve 51. FIG. 1B. Once U-tube 50 is completely submerged and filled with source water, vent valve 51 is closed, and U-tube 50 is raised. FIG. 1C.

Since there is no way for the air to enter U-tube 50 to displace the water, the section of U-tube 50 above the water level remains full of water due to atmospheric pressure on the outside water surface. FIG. 1D. However, the internal pressure at the top of the water column inside U-tube 50 is now equal to the atmospheric pressure of 760 mmHg (or 10330 mm $H_2O$), less the height of the water column inside U-tube 50. For instance, if the height of the water column is 8.30 meters (or 8300 mm $H_2O$), the internal pressure at the top of U-tube 50 is:

10330 mm $H_2O$−8300 mm $H_2O$=2030 mm $H_2O$ (or 149.5 mm Hg—or 80% vacuum).

But there is a limit to the height of water column the atmospheric pressure can support. Atmospheric pressure is equal to the weight of a fresh water column of 10.33 meters high. It is about 10.0 meters for seawater with a specific gravity of 1.03. If U-tube 50 is raised higher than 10.0 meters, the water level remains at that maximum level, while a vacuum is created above it. FIG. 1E.

However, water would rapidly evaporate into the vacuum until the vapor pressure in the vacuum chamber reaches an equilibrium point where the amount of evaporation and condensation will be equal. This increased pressure in the vacuum chamber will also cause the water level in U-tube 50 to drop. In fact, if the water temperature is 100° C. or higher, this process will occur faster since water would boil at these conditions. Again, the boiling will stop once the equilibrium point is reached. It is important to note that the equilibrium point, dictated by the boiling point (temperature/pressure combination), is achieved after a brief transition period. FIG. 1F.

Figure 2:
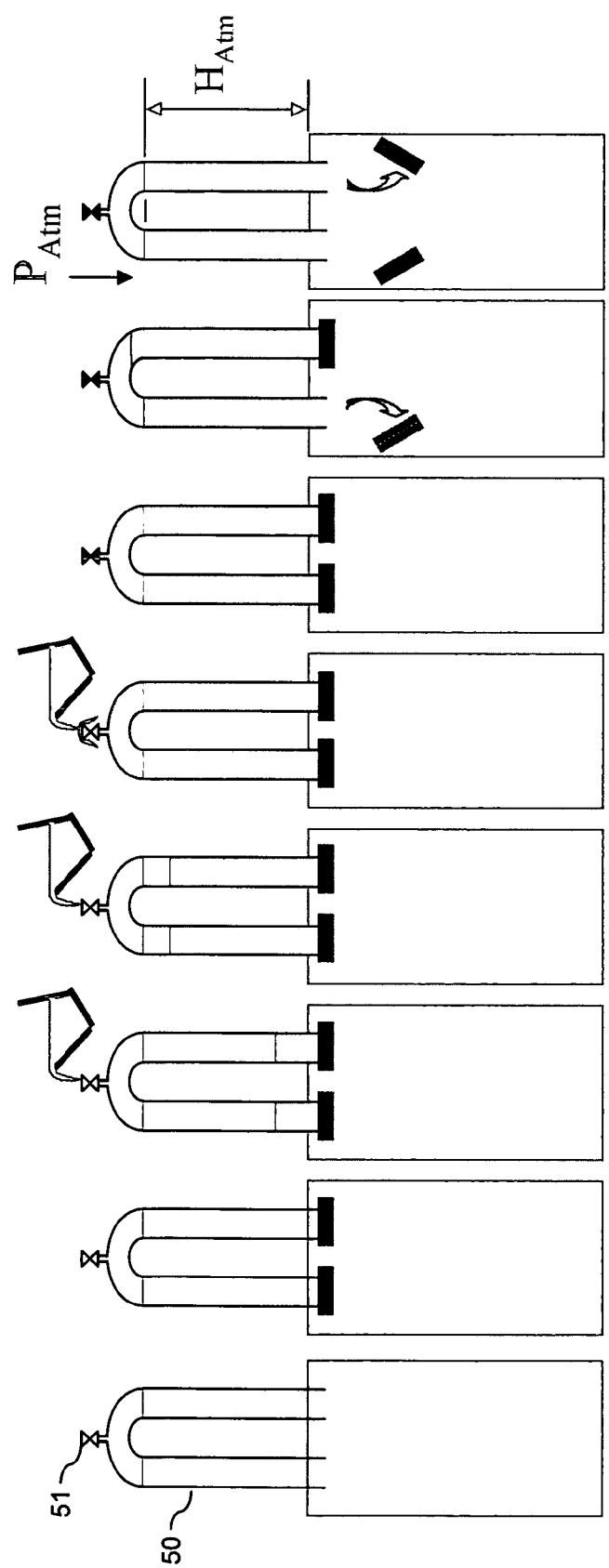
FIG. 2 is a series of cross-sectional diagrams that demonstrate another method for establishing the partial vacuum necessary for the operation of a specific embodiment of the water purification system of the present invention.

As U-tube 50 is further raised, the water level remains almost constant while the vacuum chamber is enlarged. If the water temperature is kept constant, the boiling will restart and continue until the equilibrium point is reached again. In this new equilibrium condition, the amount of water vapor is increased but the vapor pressure and the water column height are both the same as before. This demonstrates the fact that the source water will continue to boil at ambient temperatures of around 100° C. as long as the vacuum condition above it can be maintained by sucking out the water vapor. In this simple example, this sucking out is accomplished by expanding the volume of the vacuum chamber. FIG. 1G. Since it may be cumbersome to lift a water filled U-tube comprised of, for example, metal, composites or plastics, with a height of over 10 meters, the same result may be achieved by keeping U-tube 50 stationary on a fixed support, placing temporary enclosures on the two ends, and filling it with water through vent valve 51, as shown in FIG. 2.

Figure 3:
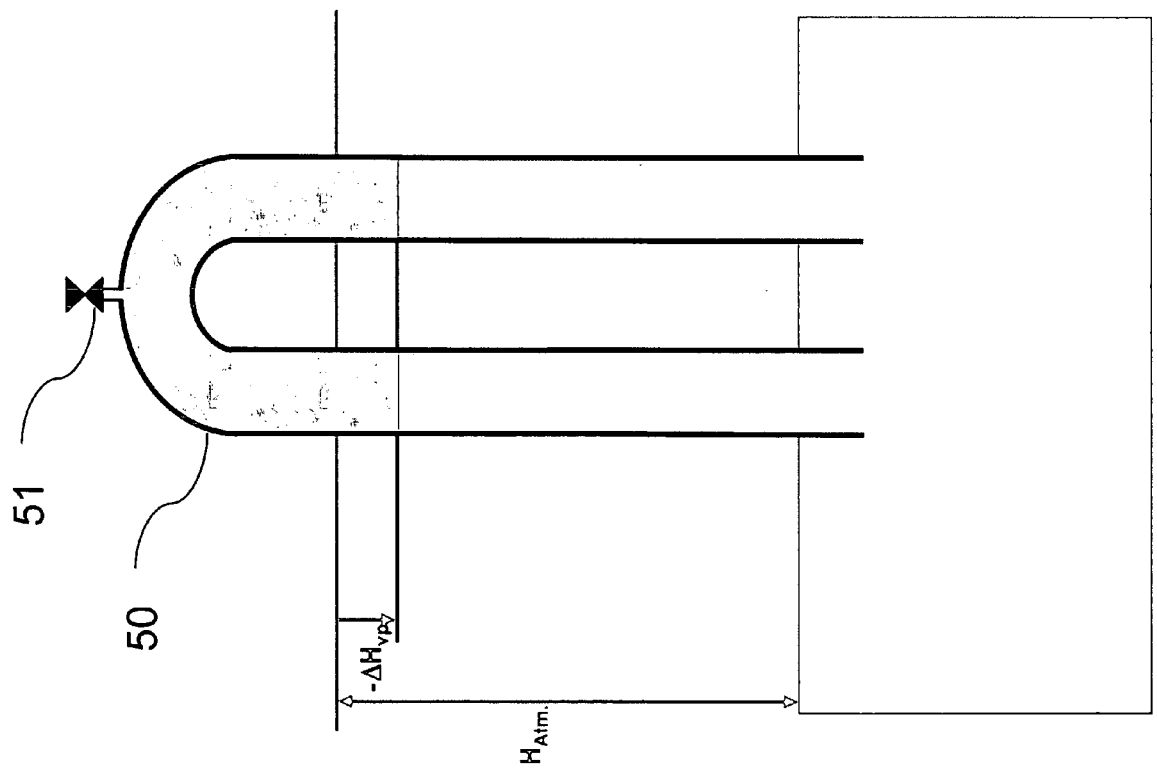
FIG. 3, a cross-sectional diagram, shows how the water level in a specific embodiment of the water purification system of the present invention will drop once the partial vacuum condition has been initially established.

Now that a water column with a vacuum cap above it has been created, some details about the factors affecting the fluid states and dynamics within U-tube 50 can be considered. Actually, achieving total vacuum above a water surface is not possible because water molecules at the surface will vaporize into the vacuum chamber even at low temperatures. (As is well known, water will boil at room temperature if placed in a near total vacuum.) Any vaporization will increase the pressure in the vacuum chamber, causing the water level in both columns of U-tube 50 to drop slightly (−ΔHvp). FIG. 3. Once the new equilibrium point for the temperature and vacuum pressure is reached, the number of water molecules evaporating at the surface of the water will be equal to those condensing back into water, resulting in a net effect of zero on the water level (thus the constant water level for a given combination of temperature and vacuum pressure.)

Figure 4:
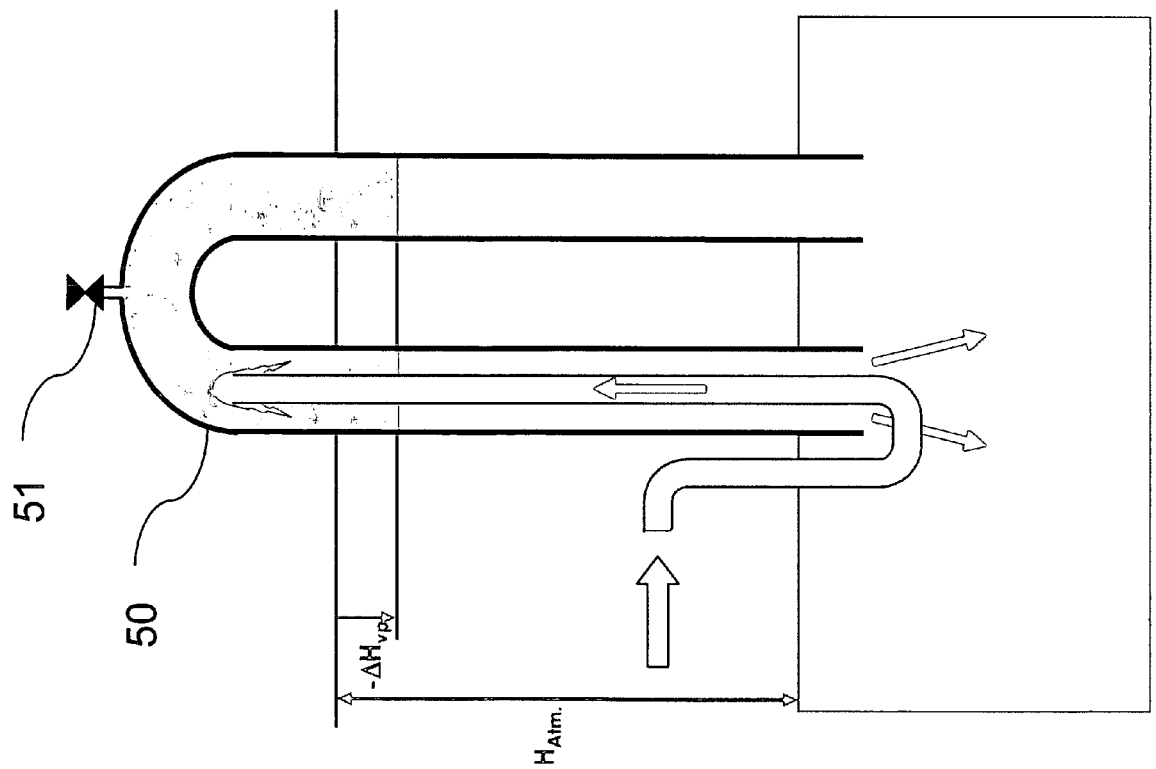
FIG. 4, a cross-sectional diagram, shows how the water level in a specific embodiment of the water purification system of the present invention will not change if water is continuously added to the system.
Figure 5:
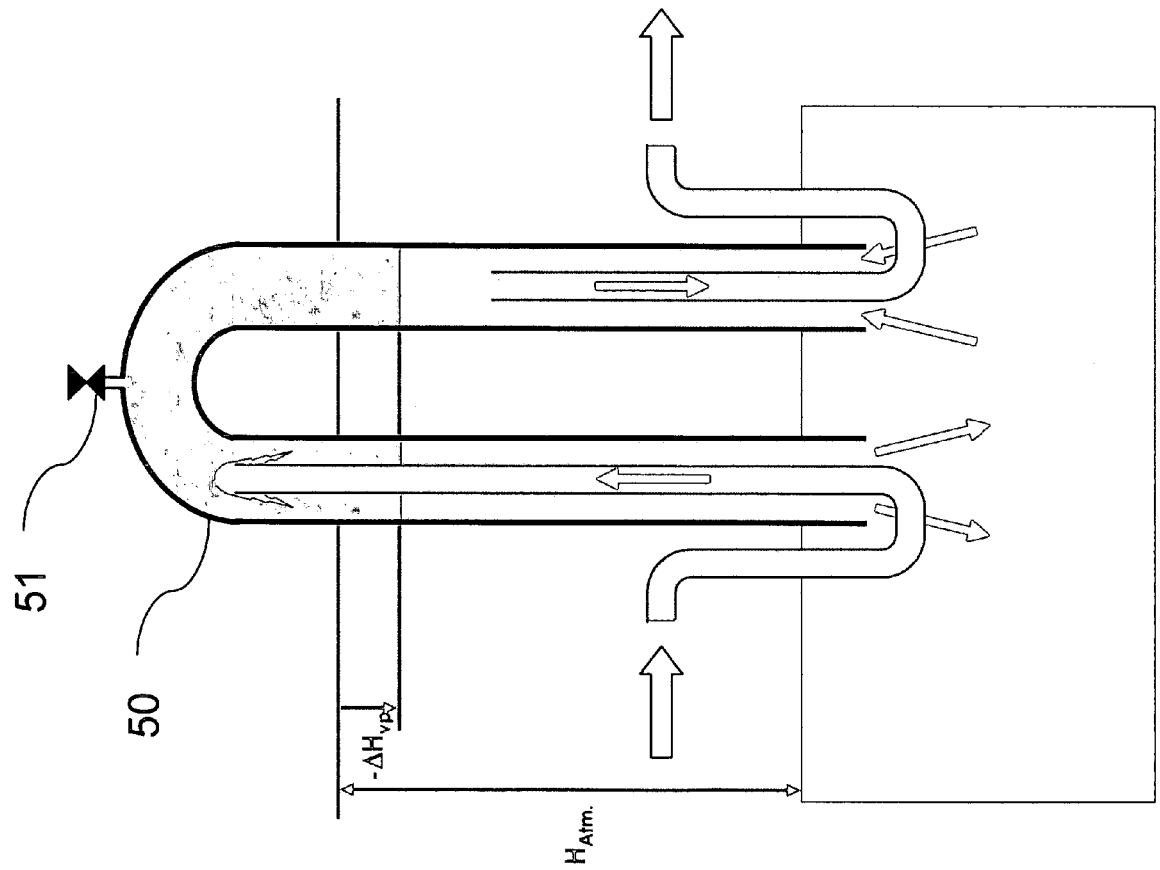
FIG. 5, a cross-sectional diagram, shows how the water level in a specific embodiment of the water purification system of the present invention will not change if water is continuously removed from the system.

If water is pumped into the vacuum chamber, the pumped water returns to the source from the bottom opening and the water level remains constant (assuming that the temperature of the water pumped in is same as the water in the U-Tube). FIG. 4. Similarly, pumping water out of U-tube 50 does not affect the water level. Indeed, an equal volume of water is naturally sucked in from the bottom, again assuming that all temperatures are the same. FIG. 5.

Figure 6:
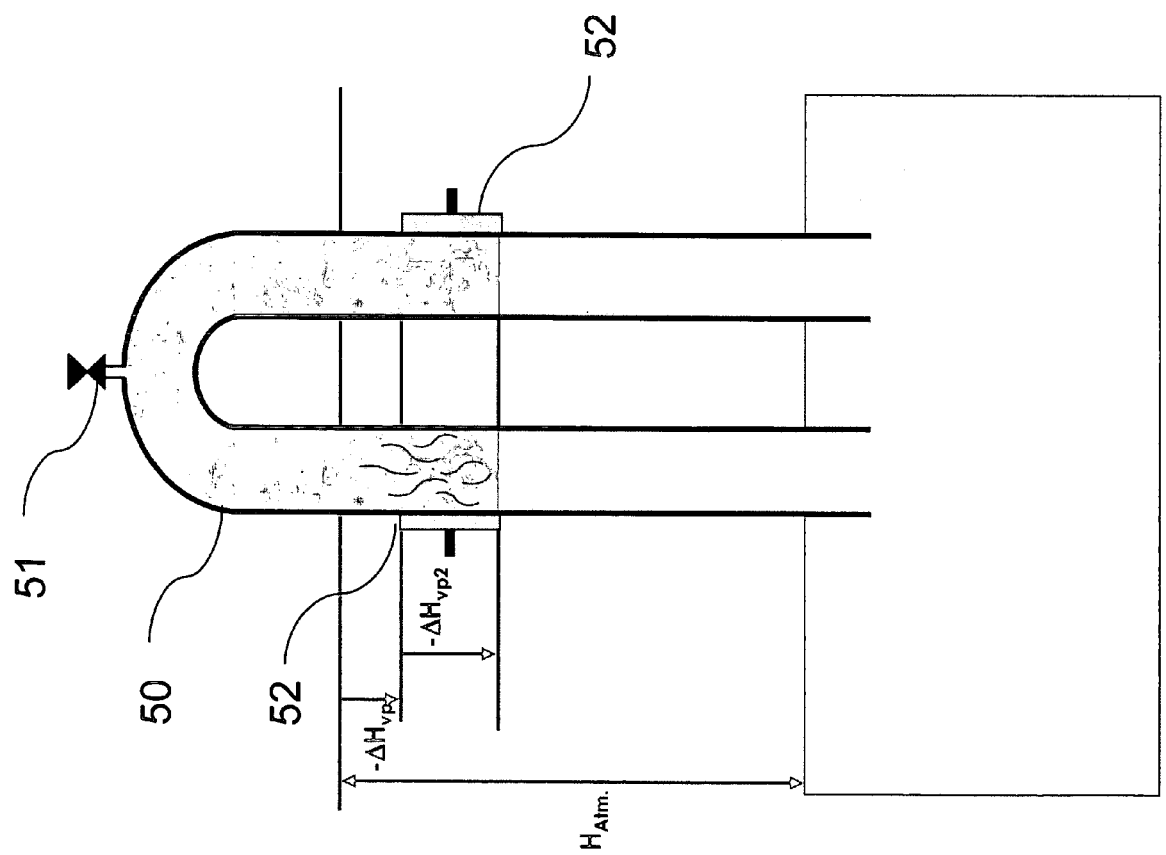
FIG. 6, a cross-sectional diagram, shows how the water level in a specific embodiment of the water purification system of the present invention will drop is two heating elements are added.

If the water temperature is increased by placing a heating element 52 on both columns, the rate of evaporation will increase. This increased evaporation increases vacuum chamber pressure, which in turn further drops the water level in both columns of U-tube 50 (−ΔHvp2). FIG. 6. Increase in vaporization continues until the vapor pressure corresponding to the new temperature is reached within the vacuum chamber. At that new equilibrium point, the number of water molecules evaporating at the water surface again becomes equal to the number of molecules condensing back into water. Thus, the system is stabilized again. To maintain this stable point, the heat input may be reduced to a level to replace only the system's heat loss without increasing its temperature.

Figure 7:
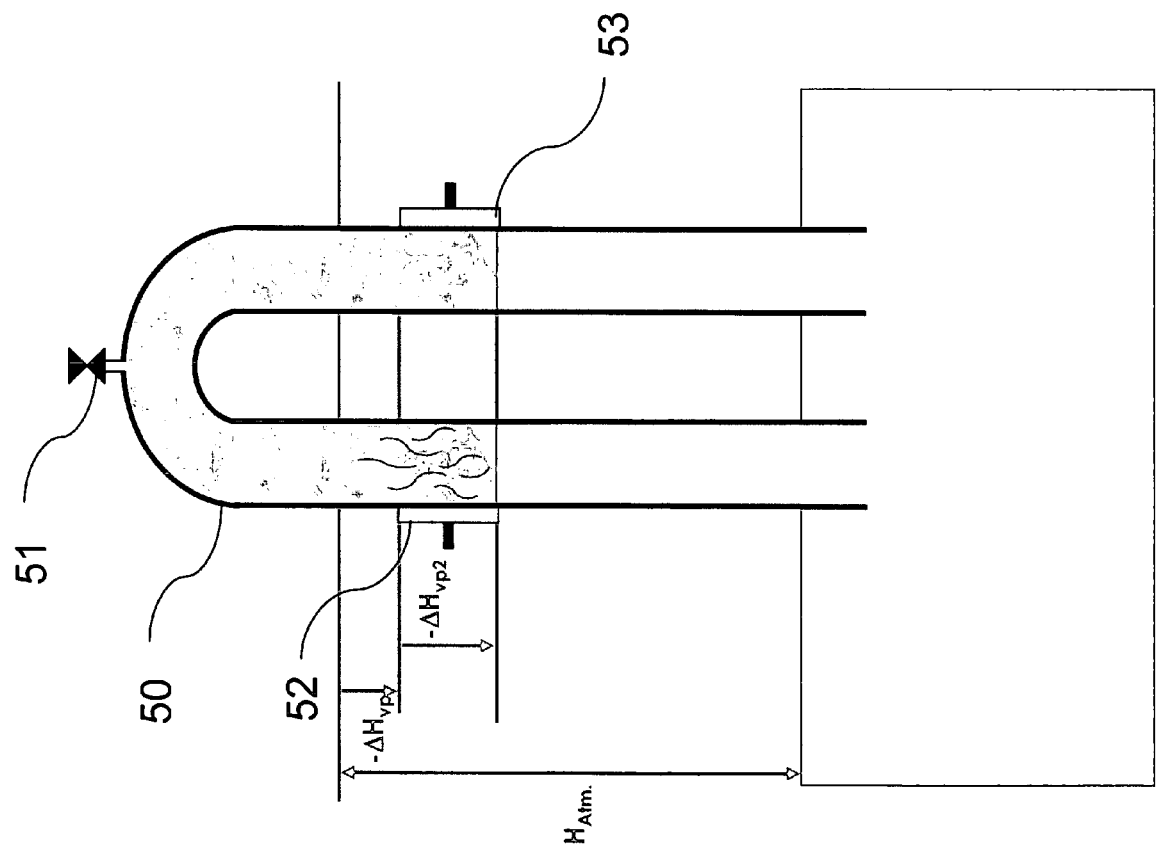
FIG. 7, a cross-sectional diagram, shows how one of the heating elements shown in FIG. 6 may be replaced by a cooling element.
Figure 8:
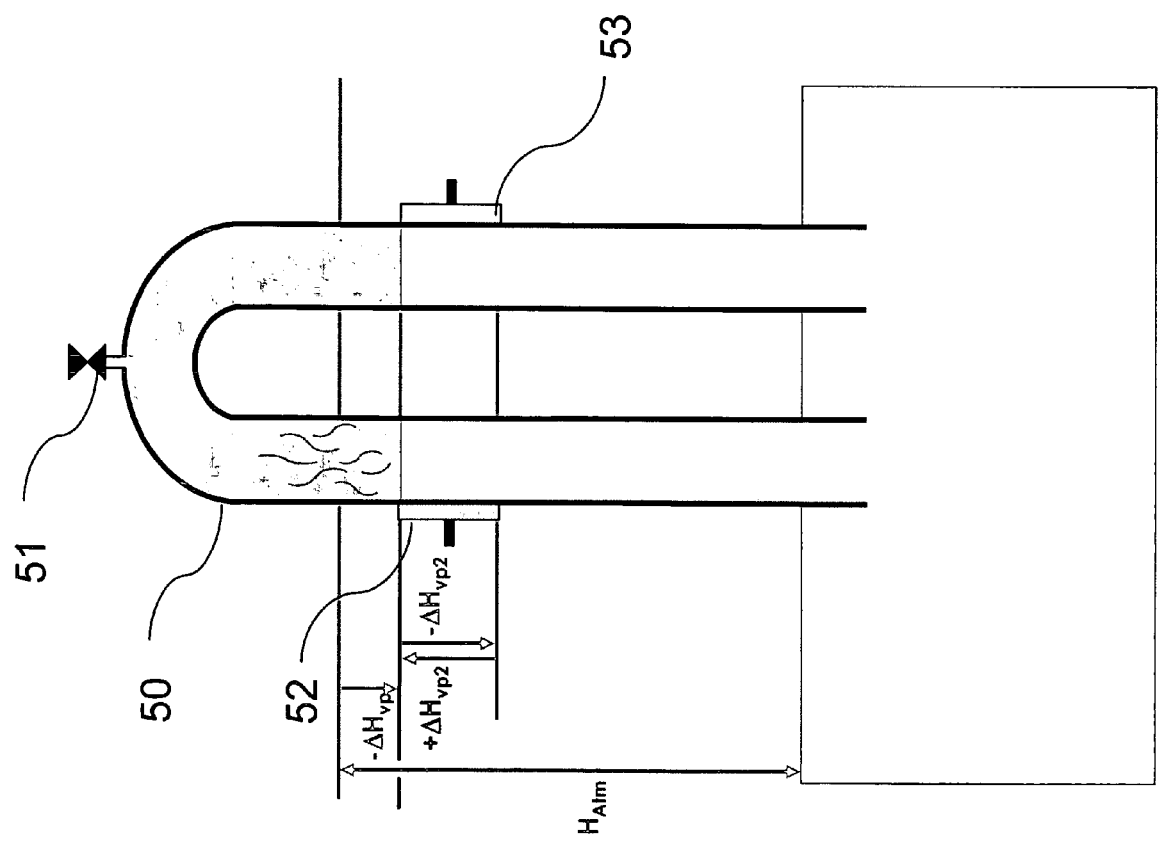
FIG. 8, a cross-sectional diagram, shows how the water level in a specific embodiment of the water purification system of the present invention will rise if one of the heating elements shown in FIG. 6 is replaced with a cooling element as shown in FIG. 7.

The heating element 52 in the right column may be converted into a cooling element 53. In addition, the heat capacity of the remaining heating element 52 may be increased, e.g., doubled, so that the heat delivered to the system remains the same as before. Further, the heating and cooling capacities of these elements 52, 53 may be set to be equal to each other so that the number of calories delivered to and extracted from the system will be substantially the same. FIG. 7. This will mean that water level in both columns will rise by the same +ΔHvp2 (after a transition period), and stabilize at the level prior to the installation of the original heating elements 52. This is because any heat delivered by the heating element is now extracted by the cooling element 53, returning the overall average temperature—and thus the pressure of the vacuum chamber to what it was prior to the installation of the original heating elements 52. FIG. 8. The number of water molecules evaporating is again equal to the number of molecules condensing. However, there is a significant difference now: almost all of the evaporation is occurring in the heated column and almost all of the condensation is occurring in the cooled column. Unlike before, continuous input and extraction of equal amounts of heat to and from the system may be needed to maintain this stable condition. This is now a continuous and dynamic cycle of water entering into the heated column and rising to the surface, evaporating into the vacuum chamber, condensing in the cooled column, and flowing out of the cooled column.

Figure 9:
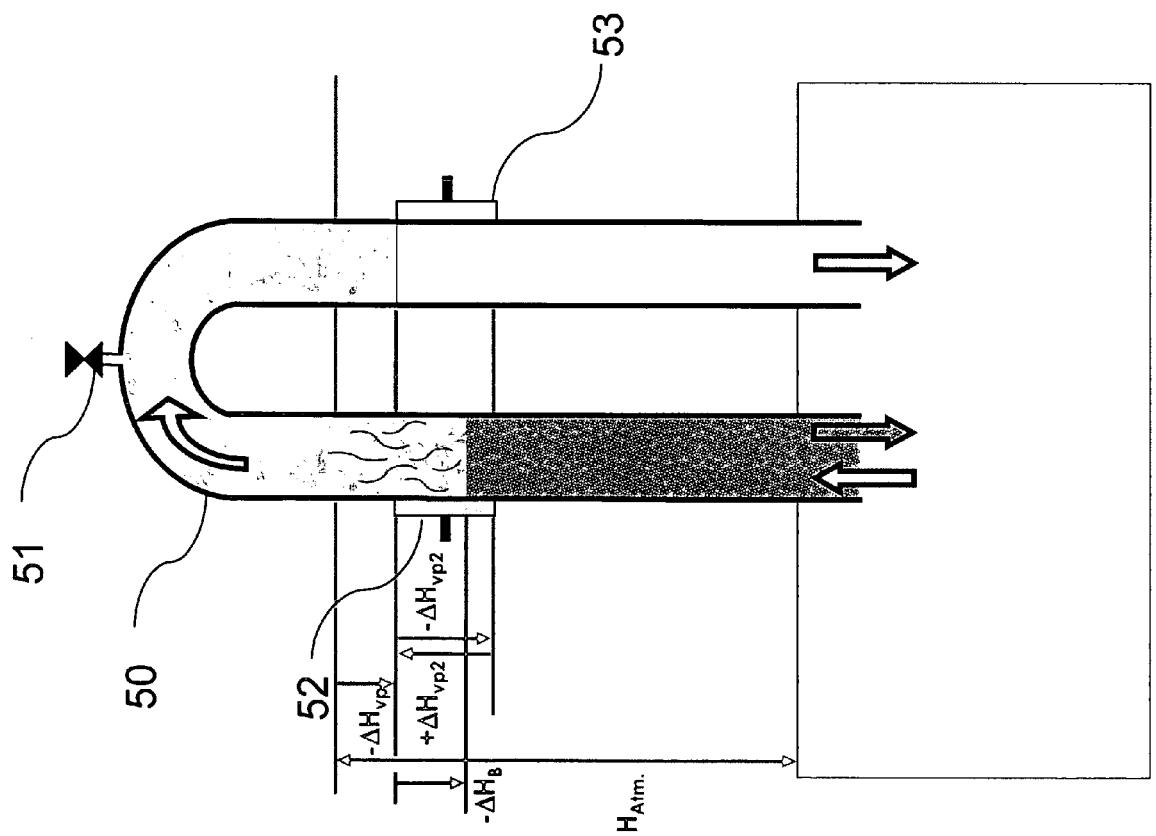
FIG. 9, a cross-sectional diagram, shows how, on one side, the water level in a specific embodiment of the water purification system of the present invention will drop due to evaporation caused by the heating element.

However, this continuous evaporation causes the impurity content and the specific gravity of the liquid in the heated column to increase, resulting in a new equilibrium point at a still lower liquid level (−ΔHB). This drop of liquid level will mean expansion of the vacuum chamber, which will lower its pressure. FIG. 9. This in turn will result in increased vaporization, which will eventually raise the pressure back to what it was (the equilibrium point for the given temperature), and which then causes the liquid level in the condensation column to stabilize where it was prior to the liquid level drop in the vaporization column. At this point, a complex counter flow regime develops with the heavier wastewater trying to sink out of U-Tube 50 and the lighter source water trying to rise against the wastewater to replace it. To make things even more complex, salt molecules and impurities diffuse from the wastewater into the source water through out this process. Increased salt and impurity content also tends to inhibit the rate of vaporization.

Figure 10:
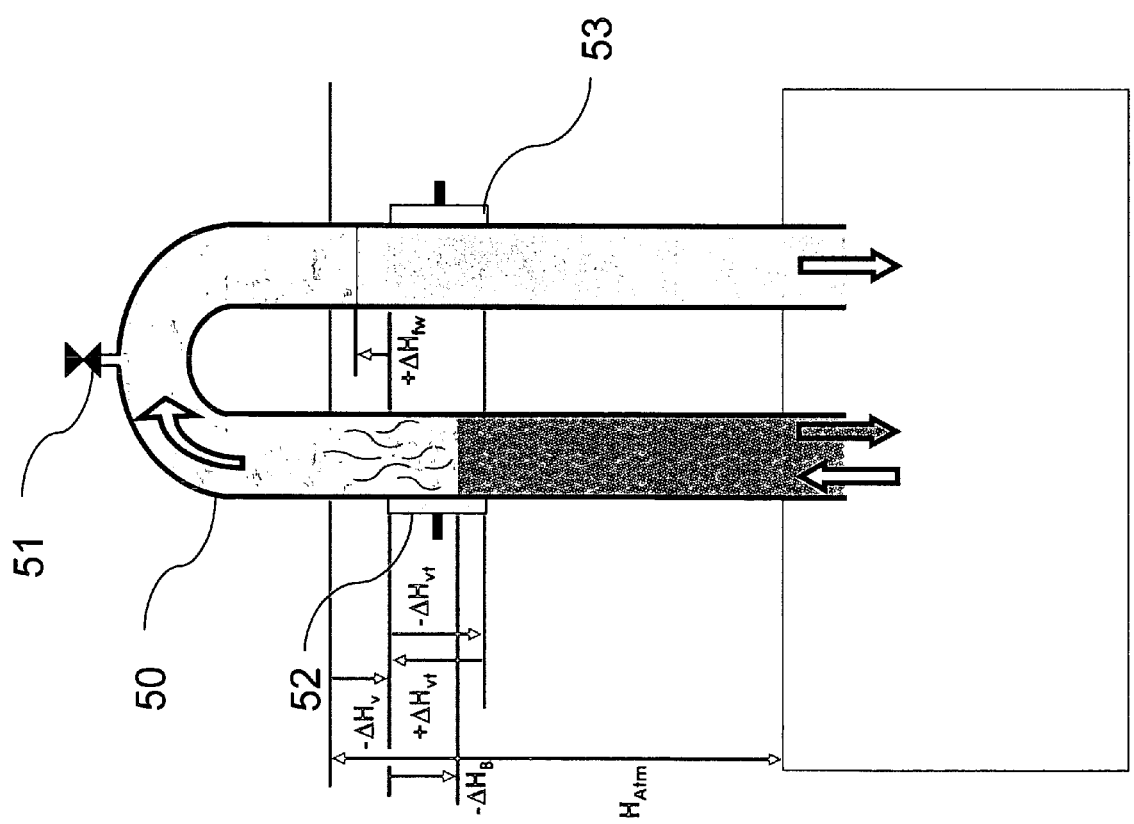
FIG. 10, a cross-sectional diagram, shows how, on the opposite side, the water level in a specific embodiment of the water purification system of the present invention will rise due to condensation caused by the cooling element.

Simultaneously, vapor in the vacuum chamber condenses in the cooled column. This continuous condensation eventually causes the source water in the cooled column to be displaced by condensed fresh water. FIG. 10. Since fresh water has a lower specific gravity, the water level in the cooled column, supported by the atmospheric pressure (minus the pressure in vacuum chamber), rises to a new point of equilibrium (+ΔHfw). The water level of the heavier water in the other column remains the same. From this point on, any further condensation flows out through the bottom opening of the cooled column, completing the stabilized fluid circulation through the system. Again, it is important to note that the pressure in the vacuum chamber remains relatively constant throughout this transition period because any decrease in the volume of the vacuum chamber (due to rising clean water column level) is compensated by more condensation (and/or less evaporation in the heated column).

It should be noted that these two events (dropping water level in the heated column and the rising water level in the cooled column) actually occur simultaneously. This explains why the vacuum pressure remains basically constant through out this transition period (while one column level is dropping the other is rising, keeping the volume of the vacuum chamber basically the same). It is also important to note that until this equilibrium is reached, the drop in water level of heated column is achieved primarily by increased vaporization (the height of the water column drops but its weight remains the same due to increased impurity content). Similarly, the rise in the cooled column is achieved by condensation alone (the height of the water column rises but its weight remains the same due to decreased impurity content).

After equilibrium is reached, the liquid levels in both columns remain constant (if the heat input into one column and the extraction from the other column is constant and equal). From this point on, source water is naturally sucked into the heated column to make up for evaporative losses and to maintain the atmospheric head. Conversely, an equal volume of the condensed fresh water flows out of the cooled column to equalize the continuous condensation and to maintain the atmospheric head.

Figure 11:
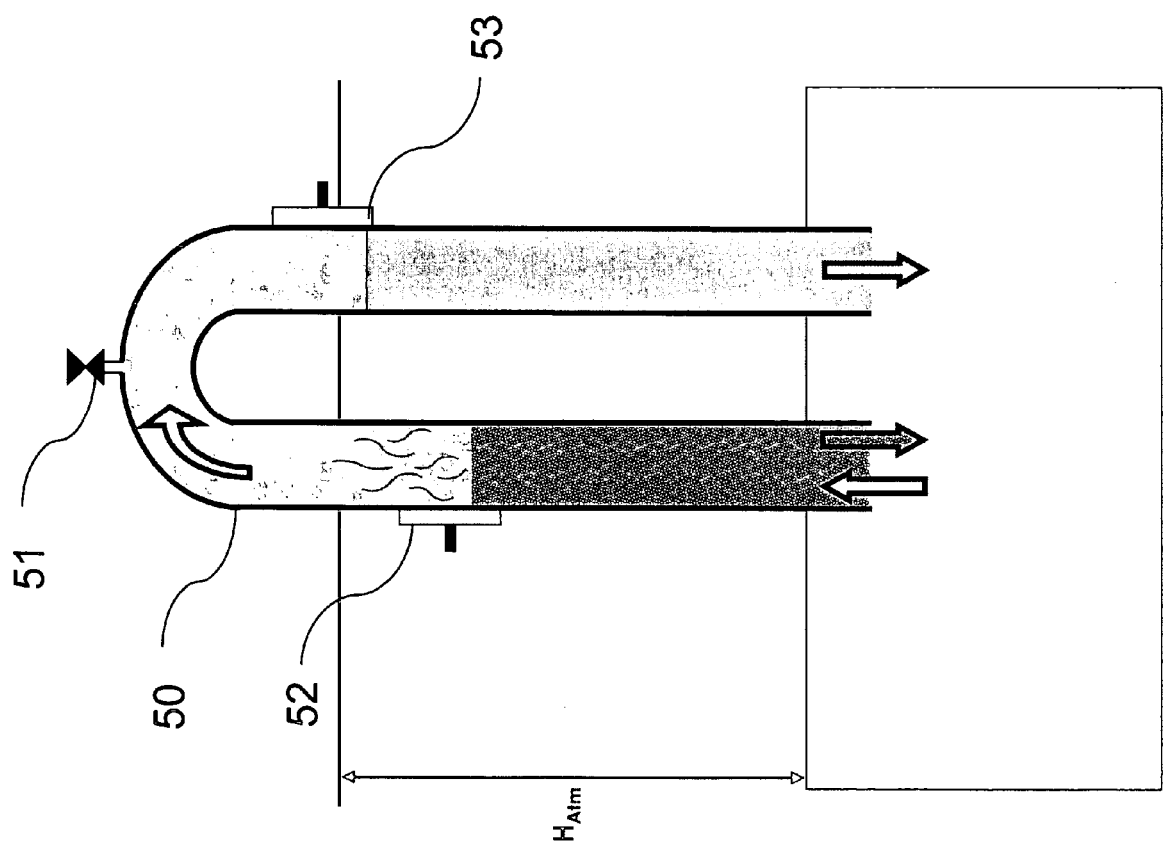
FIG. 11, a cross-sectional diagram, shows how cooling element may be raised to increase the efficiency of a specific embodiment of the water purification system of the present invention.

At this point cooling element 53 in the condensation column is raised to increase the efficiency of condensation (rather than cooling the water that has already condensed). FIG. 11. As inefficient as it may be, this in effect is a combination water circulation and purification system with no moving parts—except the water flow. This inefficiency is mainly due to the following factors: 1) the increased concentration of impurities in the heated column will result in lower rate of evaporation; 2) sinking of wastewater out of the heated column meets a counter flow of source water rising to replace it; and 3) gradual infusion of impurities will occur into the fresh water column from the opening at the bottom, contaminating the fresh water.

Figure 12:
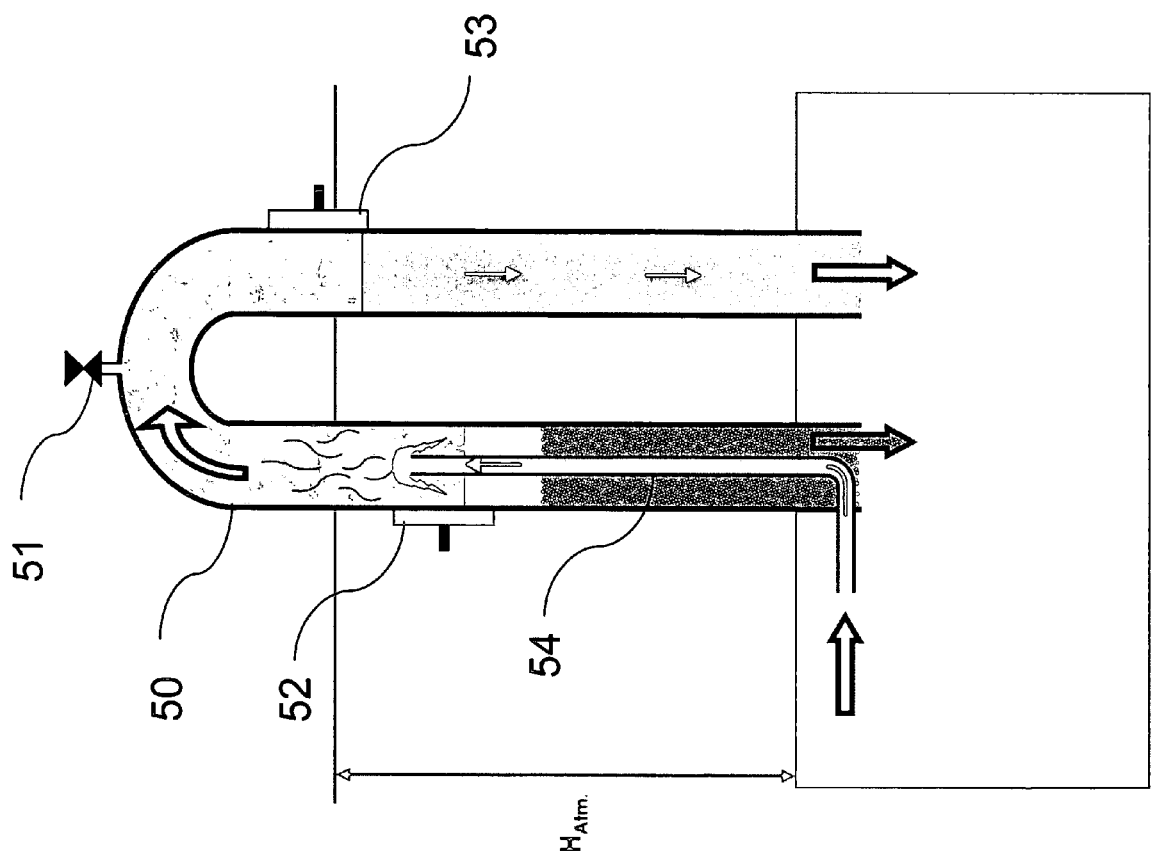
FIG. 12, a cross-sectional diagram, shows how a separate water inlet line may be added to increase the efficiency of a specific embodiment of the water purification system of the present invention.
Figure 13:
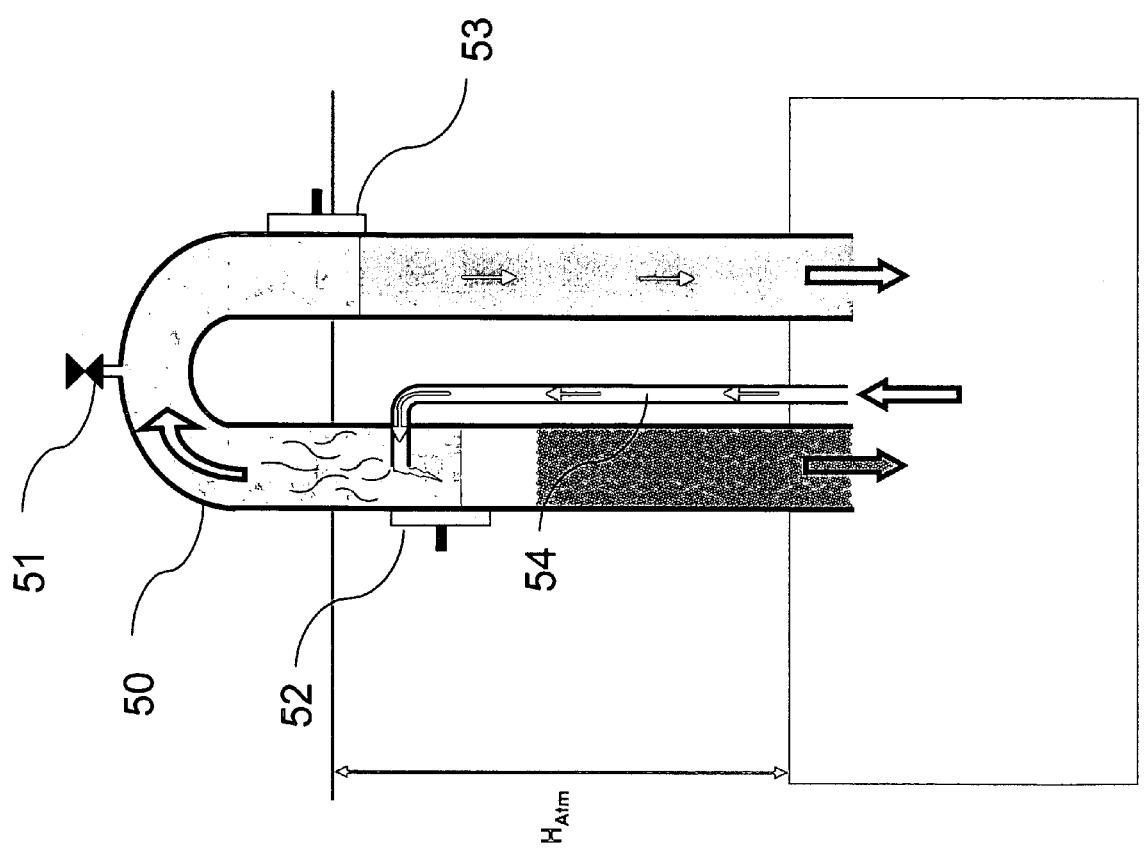
FIG. 13, a cross-sectional diagram, shows how the separate water inlet line may be moved to further increase the efficiency of a specific embodiment of the water purification system of the present invention.

These causes of system inefficiencies can be eliminated or reduced. First, the factors lowering the vaporization rate in the heated column for a given temperature and partial vacuum can be decreased. Addition of a separate flow line 54 for source water to travel directly into the vacuum chamber without having to filter through the column of wastewater (FIG. 12) has several advantages. Since the atmospheric head of source water is higher than that of the wastewater, the source water in the inlet pipe will reach a higher elevation and spill down to form a thick layer above the column of wastewater. This will result in vaporization of source water instead of wastewater, which will improve the rate of vaporization and reduce the tendency of scale formation. The action of spilling will increase the surface area for evaporation for an even more significant improvement in the rate of vaporization. Indeed, the higher density of the wastewater column will assure that the water level will remain below the inlet nozzle for continuous spraying in all conditions. In addition, since the column of wastewater contains high levels of heat, placing flow line 54 within the column will result in an effective means of heat recovery. However, pre-heating the in-flow line could cause scale formation. To prevent this, the flow line 54 may be moved outside the wastewater column. FIG. 13.

Figure 14:
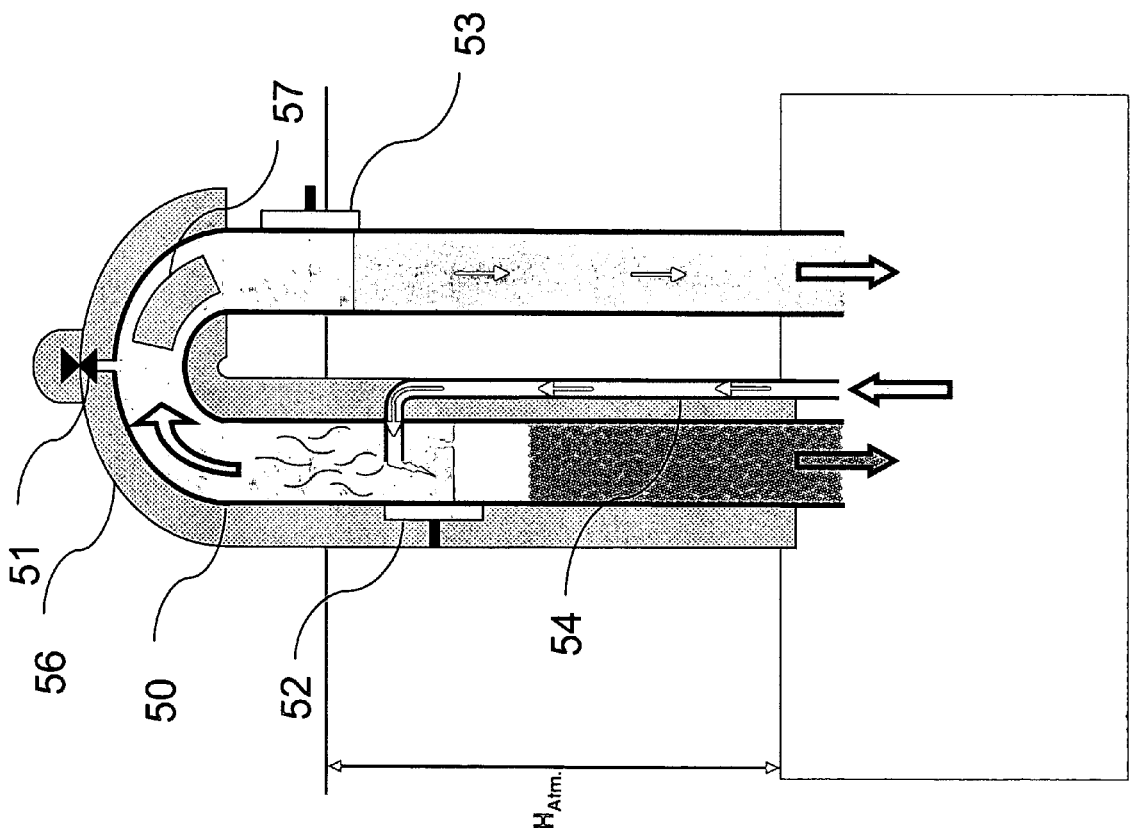
FIG. 14, a cross-sectional diagram, shows how insulation may be added to increase the efficiency of a specific embodiment of the water purification system of the present invention.

An insulating jacket 56 around the heated column will increase the system efficiency and the rate of vaporization. FIG. 14. Addition of a heat insulated divider 57 to separate the vaporization and condensation chambers will further improve the system efficiency by preventing heat absorption by the condensation side from the evaporation side (provided that the passage of the vapor is not inhibited to a degree where it will cause excessive pressure buildup in the vaporization chamber). When designing a vessel utilizing this concept, the evaporation surface may be further increased by enlarging the diameter of the vessel at the evaporation chamber. This will result in significant increase in the efficiency of heat usage.

Figure 15:
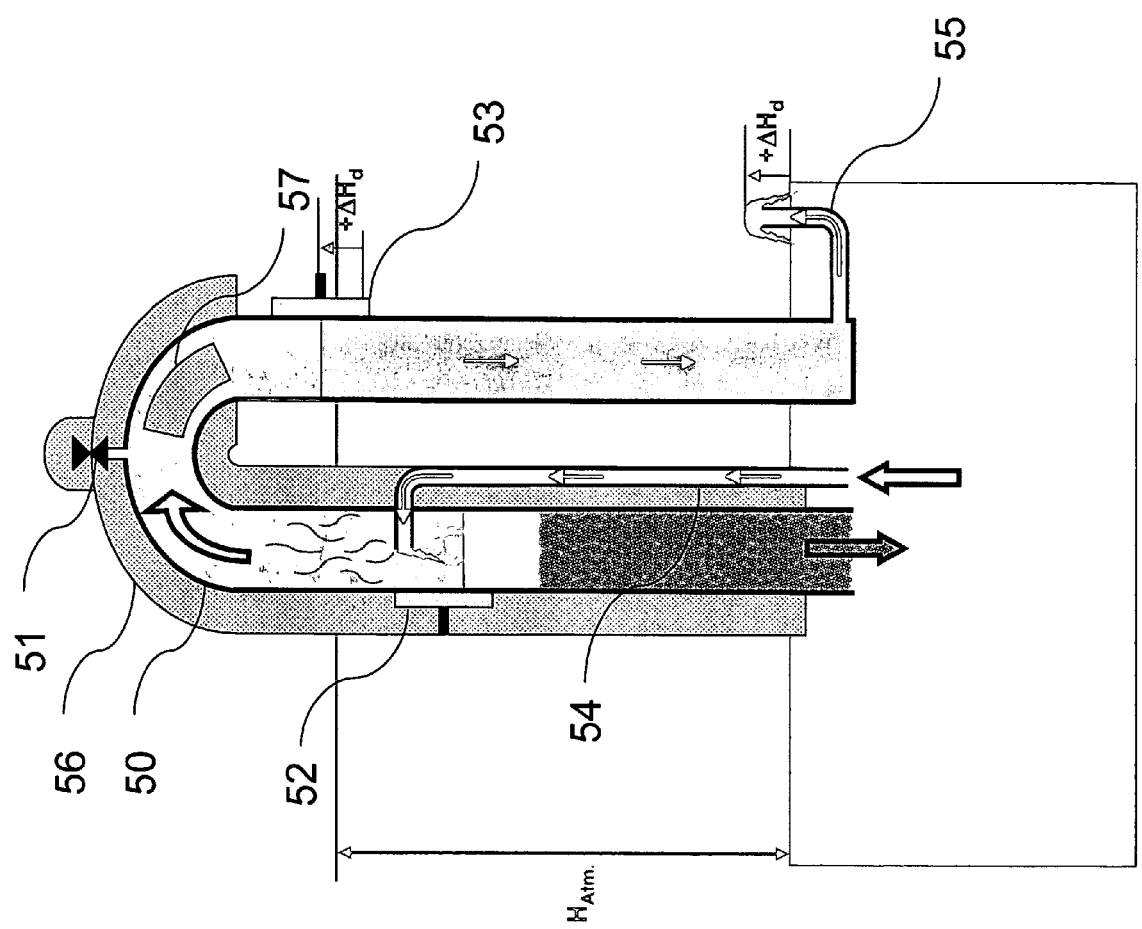
FIG. 15, a cross-sectional diagram, shows how a separate water discharge line may be added to increase the efficiency of a specific embodiment of the water purification system of the present invention.
Figure 16:
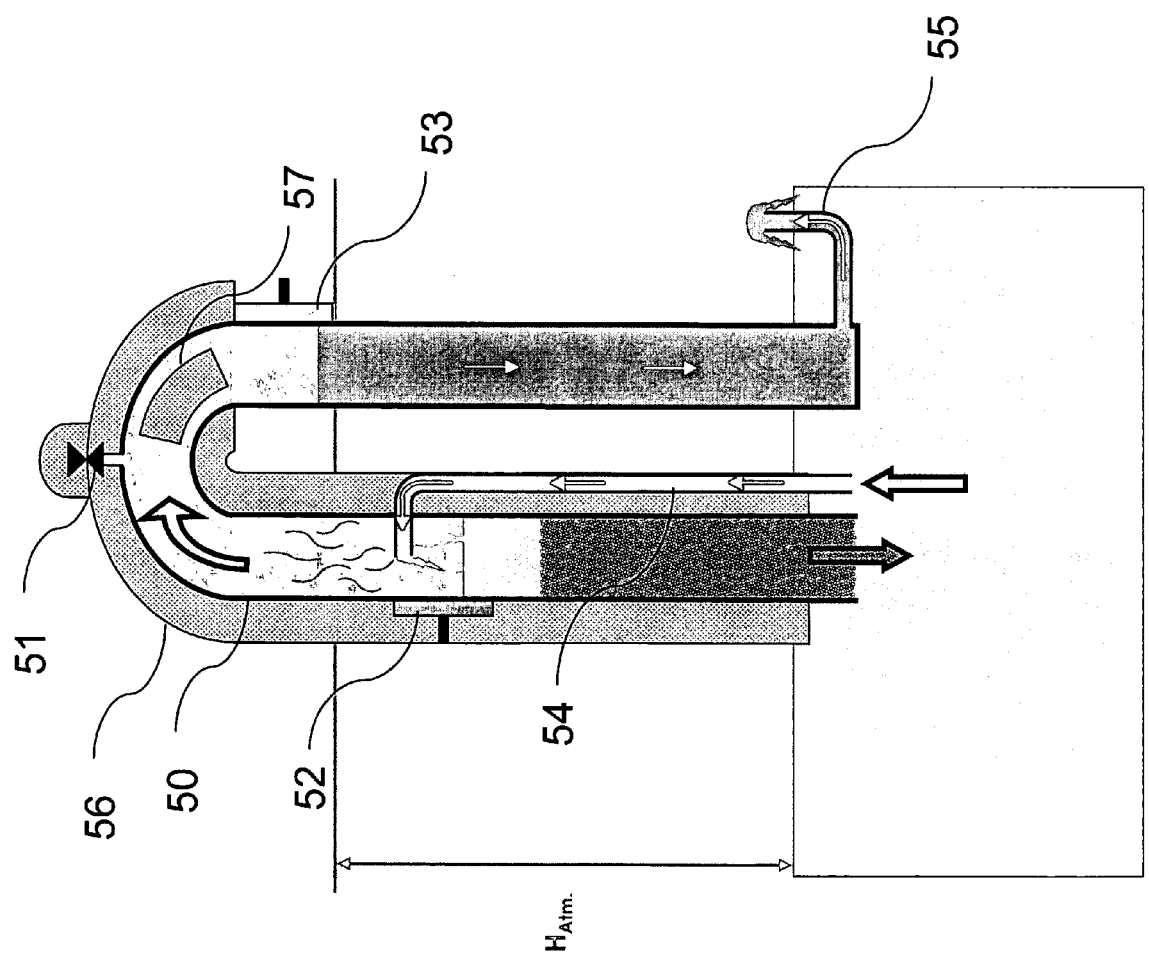
FIG. 16, a cross-sectional diagram, shows how cooling element may be raised again to further increase the efficiency of a specific embodiment of the water purification system of the present invention.

The inefficiencies in the condensation column may also be reduced. First, by closing the bottom of the cooled column, and adding an external discharge line 55 that rises above the source water level, the contamination of the distilled fresh water is eliminated. FIG. 15. Note that since the end of discharge line 55 is above the source water level by +ΔHd, the liquid level within the cooled column will also rise by the same amount. This rise will temporarily increase the vacuum pressure and lower the rate of vaporization within the vacuum chamber. However, after a brief transition period, these factors will stabilize again at their previous values. The fresh water discharge point above the source water level will also make it easier to recover the fresh water. At this time, cooling element 53 may be raised again to keep it in better contact with the vapor cap. FIG. 16.

Thus, the systems and methods of the present invention may be used to purify water. Unpurified water flows into one side of U-tube 50, and purified water flows out of the other. As the interior of U-tube 50 is under partial vacuum conditions, these flows will continue indefinitely, thus creating a continuous stream of purified water. The preceding description is not meant to limit the invention in any way, and is provided simply to further understanding of the specific embodiment described below.

Figure 17:
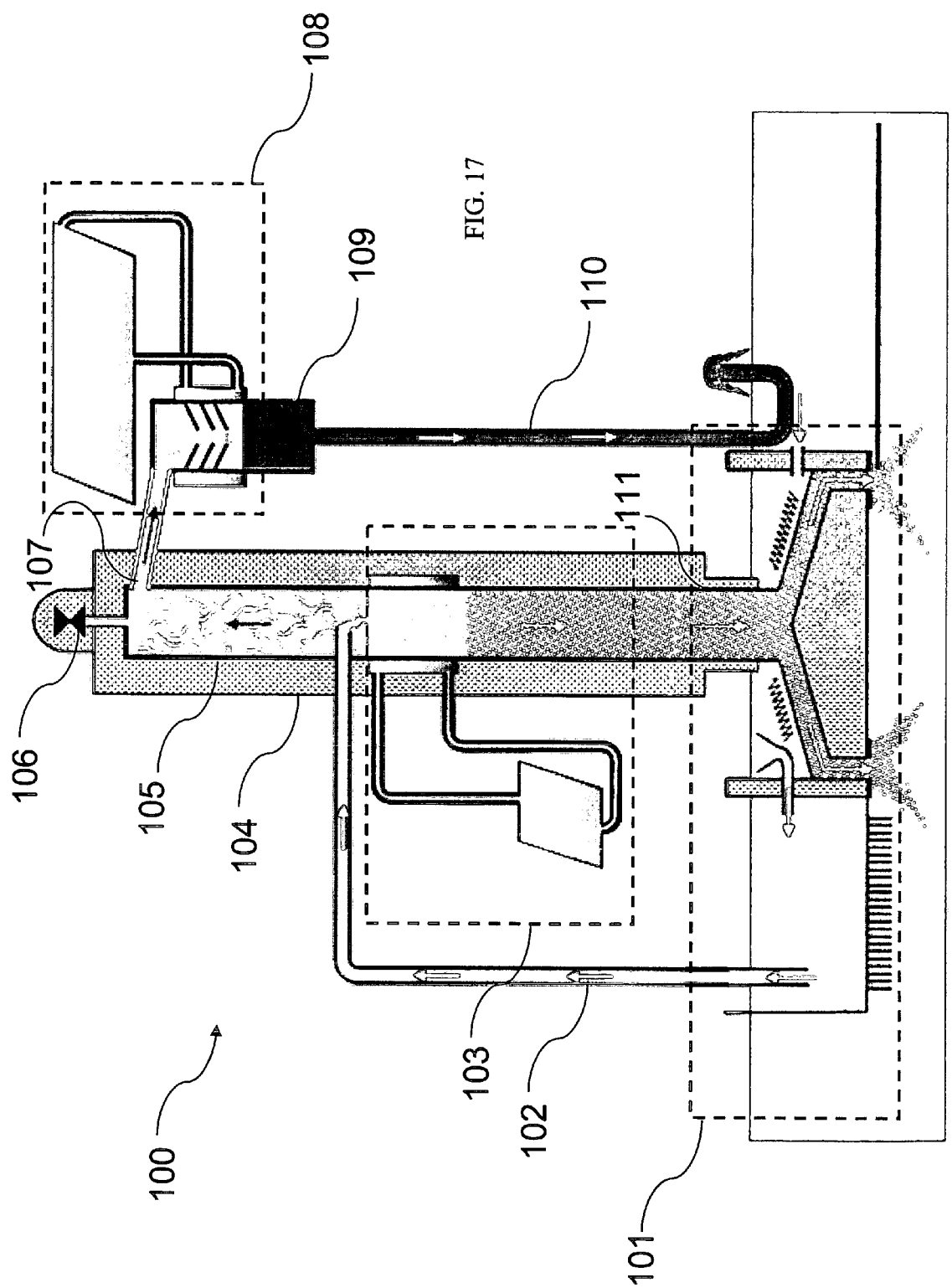
FIG. 17 is a cross-sectional diagram of one specific embodiment of a water purification system of the present invention.

FIG. 17 is a cross-sectional diagram of one specific embodiment of a water purification system of the present invention. Water purification system 100 operates in similar fashion to the U-tube described above. As shown in FIG. 17, in specific embodiments, water purification system 100 may comprise degasification unit 101, source water inlet line 102, heating unit 103, insulation 104, evaporation chamber 105, input valve 106, duct 107, cooling unit 108, condensing chamber 109, water discharge line 110, and wastewater discharge line 111.

As shown in FIG. 17, source water inlet line 102, evaporation chamber 105, duct 107, condensing chamber 109, water discharge line 110, and wastewater discharge line 111 are interconnected, and for the purposes of description, these attached portions will be referred to as the "interior system." As shown in FIG. 17, in specific embodiments, portions of the interior system may be covered with insulation 104 to increase efficiency. In specific embodiments, one or more elements of the interior system may comprise a polyvinyl chloride ("PVC") pipe. The use of PVC pipe has several advantages. Unlike most readily available, low cost metals, PVC does not corrode or scale up when exposed to salt water. It is lightweight (for transportation) and very easy to cut and glue (no welders or skilled metal workers are required). It is also considerably cheaper than any metal pipes. Alternatively, if the invention is to be used in a location where PVC pipe is unavailable, the pipes may be constructed from pressure treated wood. Further, the pipes may also be constructed from non-pressure treated wood that has been painted or treated on the inside surfaces to hold water. In other embodiments, the pipes may be constructed of any other appropriate material such as metals like aluminum, plastics, composites and combinations thereof.

In specific embodiments, the interior system may be under a partial vacuum condition. For example, and not to limit the invention, the interior system may be about a 69% vacuum. As the boiling point of water becomes lower under a vacuum, the partial vacuum condition will allow water within the interior system to boil, evaporate, and condense at lower than normal temperatures.

Maintaining the interior system at a partial vacuum has many other advantages as well. For example, more of the available heat is used for the latent heat of phase change to substantially improve over all system efficiency (both while heating and cooling). Further, most chemicals, oils and minerals do not evaporate at these low temperatures. Thus, the water vapor and condensed water created are cleaner. Finally, such low temperatures prevent the formation of scaling within the vessel that is a major source of maintenance in other water purification systems. The combination of all these factors allows the simplification of the equipment design and the materials used to construct it.

An exemplary setup and operation of an embodiment of water purification system 100 is shown in FIG. 17. Initially heating unit 103 and cooling unit 108 are turned off. Temporary closures, which may be blind flanges, on the openings of source water inlet line 102 and wastewater discharge line 111 are installed. Input valve 106 is opened and source water is poured into the interior system, thus forcing air out.

When water starts to overflow from water discharge line 110, a temporary closure is installed on it and the water continues to fill in the interior system. When water starts to overflow from input valve 106, the entire vessel is full of water and no air pockets remain. Input valve 106 is then closed. Then, the temporary closure on source water inlet line 102 is removed and the water level within evaporation chamber 105 drops to the atmospheric head. Then, the temporary closure on wastewater discharge line 111 is removed. Then, the temporary closure on water discharge line 110 is removed and the water level in condensing chamber 109 drops to its own atmospheric head.

Then, the evaporation and condensation of water within the interior system are allowed to reach equilibrium and the liquid levels are lowered by $-\Delta$Hvp (the degree of this drop is mainly determined by the ambient temperature). The flow of water from the water discharge line 110 stops after this equilibrium stage is reached.

Then, both heating unit 103 and cooling unit 108 are slowly turned on. Since the amount of heat input is approximately equal to the amount of heat extracted, theoretically speaking, the liquid levels in the interior system do not change much. Each time the heater and the cooler temperature are changed by the same amount, liquid levels stabilize at the same height after a brief transition period.

As the process progresses, the impurity level of the water column in evaporation chamber 105 increases gradually. This again causes the water level to fall in that column by $-\Delta$H (wastewater). After the wastewater level drops below the top end of the source water inlet line 102, source water starts to flow in, forming a layer above the column of wastewater. This increases the rate of evaporation and reduces the formation of scale. It is important to note that the top of source water inlet line 102 is placed below the atmospheric head for source water. This provides an operational flexibility to account for variations in the amount of energy available from the heating unit 103 in use. At the same time, the impurity levels in the piping at the right side of the vessel gradually decrease due to increasing condensation and eventually it becomes fresh water. Due to lighter specific gravity of fresh water, the liquid level in the condensation column increase by $+\Delta$Hfreshwater.

When operating at the optimum design temperature, evaporation and condensation rates are equal; the liquid level in both the evaporation chamber 105 and condensing chamber 109 remains constant while the flow rates through source water inlet line 102 and water discharge line 110 continue at equal and steady rates. It should be noted here that the capacity of cooling unit 108 may be designed, for example, to be twice as high as heating unit 103. This allows the condensation rate to remain equal to the changing evaporation rates due to variations in solar incidence (clouds, etc.) or variations in the amount of energy available from heating unit 103, if other than solar. When the temperature drops, the evaporation rate is reduced and the liquid level in the heated column rises slowly (because more of the wastewater is displaced by the arriving source water that is not being evaporated). However, even if the entire column of wastewater is displaced by the incoming source water, the liquid level in the heated column cannot rise above the atmospheric head (at that point inflow will stop.) Lower atmospheric temperature improves condensation efficiency; however, it cannot exceed the evaporation rate. The system automatically (by natural forces of gravity and liquid dynamics) adjusts the liquid levels and flow rates in parallel to the changing evaporation and condensation rates caused by variations in atmospheric conditions.

In short, when water purification system 100 is fully operational, it takes in a stream of water with contaminants and produces a stream of purified water.

As shown in FIG. 17, in specific embodiments, water purification system 100 may comprise degasification unit 101, which may be fitted onto wastewater discharge line 111. Degasification unit 101 serves to remove gases dissolved in the source water before that source water is purified using the present invention. Since the water purification system of the present invention operates under partial vacuum conditions, dissolved gases can cause a reduction in the efficiency of the system, and therefore should be removed.

Degasification unit 101, shown in more detail in FIG. 18, may, in specific embodiments, comprise degasification tank 201, degasification inlet line 202, discharge funnel 203, source water storage tank 204, metal fins 205, and heater 206. Source water enters degasification tank 201 through degasification inlet line 202.

As shown, degasification tank 201 surrounds wastewater discharge line 111 and is open to the atmosphere. This allows waste heat from the wastewater in wastewater discharge line 111 to transfer to the source water in degasification tank 201. This heat transfer causes the temperature of the source water in degasification tank 201 to rise, which in turn releases any gases dissolved in that source water into the atmosphere. Under normal conditions, dissolved gases will be released from the source water at any temperature between about 35° C. and about 95° C. If, for some reason, the waste heat from the wastewater in wastewater discharge line 111 is insufficient to heat the source water in degasification tank 201 to the temperature desired for optimal release of dissolved gases, degasification tank 201 may, in specific embodiments, further comprise heater 206. Further, in specific embodiments, degasification tank 201 may be insulated to facilitate the heating of the source water.

Once the dissolved gases have been released from the source water in degasification tank 201, that source water may exit degasification tank 201 via discharge funnel 203 into source water storage tank 204. Discharge funnel 203 may be shaped to prevent gas bubbles from flowing into source water storage tank 204. Further, discharge funnel 203 may be shaped and positioned in such a manner to ensure that the source water entering discharge funnel 203 is sufficiently devoid of dissolved gases.

Source water storage tank 204 acts to store the degasified source water before it enters source water inlet line 102. In specific embodiments, source water storage tank 204 may be equipped with metal fins 205, which allow the source water in source water storage tank 204 to cool before entering source water inlet line 102. This cooling of the source water is advantageous because it prevents that source water from evaporating while in source water inlet line 102.

As shown in FIG. 17, in specific embodiments, water purification system 100 may comprise heating unit 103, which may be attached to evaporation chamber 105. As described above, heating unit 103 is designed to heat the water in evaporation chamber 105 such that the water evaporates. As this evaporation takes place, the impurities in the water are left behind and pure evaporated water is created. Heating unit 103 may, in specific embodiments, be designed to capture waste heat or solar heat, then transfer that heat to evaporation chamber 105.

In specific embodiments, heating unit 103 may comprise a heat pipe or heat sheet, as known to one of ordinary skill in the art. A traditional heat pipe is a sealed tube containing a small quantity of a volatile liquid (such as water) with no air or other permanent gases present. If such a pipe is placed vertically and the lower end is heated, liquid will evaporate and the vapor formed will travel to the cooler parts of the pipe where it will condense and give up its latent heat of vaporization. The condensate will then run back to the heated end where it can re-evaporate.

Because the heat transfer within the pipe comes from boiling liquid and condensing vapor, both of which have inherently very high heat transfer coefficients, and because the amount of material that has to move from one end of the pipe to the other is small, the effective thermal conductivity of the heat-pipe is very large. To illustrate the magnitude of these quantities, imagine that the heat-pipe is transmitting one kilowatt of energy using water as the working fluid. The mass flow would be just under about 0.5 g/s. At a temperature of 100° C. in a 20 mm diameter pipe, this would correspond to a vapor velocity of about 2.5 m/s.

The main useful characteristics of a two-phase thermosyphon such as the heat pipe are (1) the thermal conductivity is extremely high (a thousand or more times that of copper); (2) the thermal conductivity is almost independent of the metal from which the heat-pipe is made; and (3) the device acts as a thermal diode. That is, the conduction is very high in one direction (upwards) and very low in the other (downwards). These characteristics make heat-pipes useful wherever a large amount of heat needs to be conducted through a small cross-section. Heat pipes have been used in cooling spacecraft components, in cooling plastics-forming dies, for the construction of air-to-air heat exchangers for industrial and domestic energy recovery, and in cooling electronic components mounted in confined spaces. One of the most spectacular applications has been the cooling of the support columns for the trans-Alaska oil pipeline to prevent melting the permafrost at their bases.

In specific versions, a heat pipe comprises a capillary wick to assist the return of the liquid from the condenser end to the evaporator end. Such pipes will work without the aid of gravity. However, for terrestrial applications the gravity return heat-pipe known as the "two-phase thermosyphon" may be adequate.

A heat pipe developed by Thermocell, Ltd. (Christchurch, New Zealand) may be used in the present invention. This is a flat-plate version of the heat-pipe, which extends the range of application. The lightweight flat-plate heat-pipe, called a "heat-sheet," comprises two sheets of metal seam-welded together at the edges and carrying a pattern of indentations. The indentations create a vapor space within the heat-sheet, which is evacuated and into which the working fluid is introduced.

The heat-sheet, which is made, in a specific embodiment, of sheet steel, takes the place of the copper or aluminum absorber sheet of a conventional flat-plate collector. The thermal conductivity is sufficiently high that one only needs a small heat exchanger of copper tube along the upper region of the collector to transfer the collected heat to the water. From a user point of view, the collector is the same as a conventional flat-plate solar collector but is significantly cheaper for a given area of collector. The advantages of this construction are: (1) lower cost per unit area of collector; (2) much less copper is used; (3) light weight; and (4) significant savings during frost protection. This last feature is a result of the fact that the waterway is at the top of the panel. When water is circulated through the system to protect the waterway from freezing in frost conditions the thermal diode effect means that there is very little conduction from the waterways to the rest of the panel. The remainder of the panel does not require protection since the working fluid has a very low freezing point.

In an embodiment with a heat pipe or heat sheet, such heat pipe or heat sheet may be configured to operate at a partial vacuum, such as, for example and not to limit the invention, about a 43% vacuum. This partial vacuum would allow heat transfer to occur at a relatively low temperature. Further, in such an embodiment, the heat pipe or heat sheet may be configured to operate with distilled water as the working fluid. This is advantageous as distilled water is readily available and safe to use. In such an embodiment, the heat pipe or heat sheet may be positioned below the point where heating unit 103 attaches to evaporation chamber 105, so that when the heat has been transferred to evaporation chamber 105 and the working liquid condenses, it may naturally drain to its starting position.

Further, in such an embodiment, the heat pipe or heat sheet may be positioned to gather heat from the sun and transfer that heat to the water in evaporation chamber 105.

In alternative embodiments, heating unit 103 may be configured to capture waste heat from an air conditioner, a combustion engine, or some other apparatus that generates heat as a byproduct of its normal operation. In other alternative embodiments, heating unit 103 may comprise a solar panel, a generator, or some other heat source. In each of these embodiments, heating unit 103 is configured to transfer heat to the water in evaporation chamber 105. The water in evaporation chamber 105 then evaporates into purified water vapor.

After heating unit 103 provides heat to evaporation chamber 105 and the water in evaporation chamber 105 is evaporated, the purified water vapor then travels through duct 107 into condensing chamber 109. Once in condensing chamber, the water vapor is cooled by cooling unit 108, which, in specific embodiments, is attached to condensing chamber 109. As it is cooled, the water vapor condenses into water.

As described above, in specific embodiments, cooling unit 108 may be configured to remove heat from the water vapor in condensing chamber 109. In one specific embodiment, cooling unit 108 may be a heat pipe or heat sheet as described above, but configured to transfer heat from the water vapor into the atmosphere. In essence, cooling unit 108 may be a heat pipe or heat sheet configured such that the working liquid is heated by the water vapor, then cooled by the atmosphere, effectively using the atmosphere as a heat sink to cool the water vapor in condensing chamber 109.

In specific embodiment, cooling unit 108 may be configured to be able to transfer twice as much heat as heating unit 103. This allows the water purification system 100 of the present invention to deal with any temperature fluctuations due to variation in the heat source used.

It is to be understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

What is claimed is:

1. A method for generating a partial vacuum within a water purification system including an upside down U-tube vessel which has a first column and a second column, a first heater for heating said first column, a second heater for heating said second column, a source water inlet line which is connected to said first column of said upside down U-tube vessel at the point that is higher than the water level within said first column of said upside down U-tube vessel, a water discharge line, a vent valve, said method for generating partial vacuum within said water purification system comprising the steps of:
    opening said vent valve;
    sinking an upside down U-tube vessel into a water source until it submerges into said water;
    closing said vent valve after said upside down U-tube vessel is completely submerged into said water;
    raising said upside down U-tube vessel higher than 10 meters such that the water level remains at maximum level while a vacuum is created above it;
    pumping water out of said upside down-U-tube vessel;
    heating both columns of said upside down U-tube vessel to increase the rate of evaporation therefore reducing the water level in said upside down U-tube vessel;
    and reducing the heat temperature to a lower temperature for replacing only system's heat loss without increasing its temperature than the original temperature.

2. A method for generating a partial vacuum within a water purification system including an upside down U-tube vessel which has a first column and a second column, a heater for heating said first column, a cooler for cooling said second column, a source water inlet line which is connected to said first column of said upside down U-tube vessel at the point that is higher than the water level within said first column of said upside down U-tube vessel, a water discharge line, a vent valve, said method for generating partial vacuum within said water purification system comprising the steps of:
    opening said vent valve;
    sinking said upside down U-tube vessel into a water source until it submerges into said water;
    closing said vent valve after said upside down U-tube vessel is completely submerged into said water;
    raising said upside down U-tube vessel higher than 10 meters such that the water level remains at maximum level while a vacuum is created above it;
    pumping water out of said upside down U-tube vessel;
    heating said first column of said upside down U-tube vessel;
    cooling said second column of said upside down U-tube vessel;
    wherein the heating and cooling capacities are substantially equal.

3. The method according to claim 2, wherein an energy source for heating operation is selected from a group consisting of solar heat, air conditioning waste heat and internal combustion engine waste heat.

4. A method for generating a partial vacuum within a water purification system including an upside down U-tube vessel which has a first column and a second column, a heater for heating said first column, a cooler for cooling said second column, a source water inlet line which is connected to said first column of said upside down U-tube vessel at the point that is higher than the water level within said first column of said upside down U-tube vessel, a water discharge line, a vent valve, said method for generating partial vacuum within said water purification system comprising the steps of:
    opening said vent valve;
    sinking said upside down U-tube vessel into a water source until it submerges into said water;
    closing said vent valve after said upside down U-tube vessel is completely submerged into said water;
    raising said upside down U-tube vessel and keeping it on a fixed support;
    placing temporary enclosures on two ends of said upside down U-tube vessel;

filling said upside down U-tube vessel with water through said vent valve;

pumping water into said U-tube vessel; and keeping the temperature of the water pumped in the same as the water in said upside down U-tube vessel.

5. A method for generating a partial vacuum within a water purification system including an upside down U-tube vessel which has a first column and a second column, a heater for heating said first column, a cooler for cooling said second column, a source water inlet line which is connected to said first column of said upside down U-tube vessel at the point that is higher than the water level within said first column of said upside down U-tube vessel, a water discharge line, a vent valve, said method for generating partial vacuum within said water purification system comprising the steps of:

opening said vent valve;

sinking said upside down U-tube vessel into a water source until it submerges into said water;

closing said vent valve after said upside down U-tube vessel is completely submerged into said water;

raising said upside down U-tube vessel and keeping it on a fixed support;

placing temporary enclosures on two ends of said upside down U-tube vessel;

filling said upside down U-tube vessel with water through said vent valve;

pumping water out of said U-tube vessel; and keeping the temperature of the water pumped out is the same as the water sucked in from the bottom of said upside down U-tube vessel.

6. A method for generating a partial vacuum within a water purification system including an upside down U-tube vessel which has a first column and a second column, a first heater for heating said first column, a second heater for heating said second column, a source water inlet line which is connected to said first column of said upside down U-tube vessel at the point that is higher than the water level within said first column of said upside down U-tube vessel, a water discharge line, a vent valve, said method for generating partial vacuum within said water purification system comprising the steps of:

opening said vent valve;

sinking said upside down U-tube vessel into a water source until it submerges into said water;

closing said vent valve after said U-tube vessel is completely submerged into said water;

raising said upside down U-tube vessel and keeping it on a fixed support;

placing temporary enclosures on two ends of said upside down U-tube vessel;

filling said upside down U-tube vessel with water through said vent valve;

heating both columns of the upside down U-tube vessel for increasing the pressure in a vacuum chamber; and reducing the heat input to a level to replace the system's heat loss without increasing its temperature.

7. A method for generating a partial vacuum within a water purification system including an upside down U-tube vessel which has a first column and a second column, a heater for heating said first column, a cooler for cooling said second column, a source water inlet line which is connected to said first column of said upside down U-tube vessel at the point that is higher than the water level within said first column of said upside down U-tube vessel, a water discharge line, a vent valve, said method for generating partial vacuum within said water purification system comprising the steps of:

opening said vent valve;

sinking said upside down U-tube vessel into a water source until it submerges into said water;

closing said vent valve after said U-tube vessel is completely submerged into said water;

raising said upside down U-tube vessel and keeping it on a fixed support;

placing temporary enclosures on two ends of said upside down U-tube vessel;

filling said upside down U-tube vessel with water through said vent valve;

heating said first column of said U-tube vessel;

cooling said second column of said U-tube vessel;

and keeping cooling capacity equal to heating capacity so that the number of calories delivered to and extracted from the system will be substantially the same.

8. A water purification system comprising: an upside down U-tube vessel; a vent valve connected to said upside down U-tube vessel at the top of said upside down U-tube vessel; a water storage tank; a heater attached to a first column of said upside down U-tube vessel; a water exit line that is connected to a second column of said upside down U-tube vessel at the bottom of said second column of said upside down U-tube vessel; wherein a partial vacuum is generated at said upside down U-tube vessel by keeping the U-tube at the height that is higher than a height at which atmospheric pressure can support the water to be purified; wherein a water inlet is connected to said first column of said upside down U-tube vessel at the point that is higher than the water level within said first column of said upside down U-tube vessel to supply water to be purified to said first column by using the partial vacuum created in said upside down U-tube vessel; wherein said heater comprises a heat pipe; wherein said heat pipe is positioned below the point where said heater attaches to said first column of said upside down U-tube vessel.

\* \* \* \* \*